(12) United States Patent
Bierl et al.

(10) Patent No.: US 10,214,097 B2
(45) Date of Patent: Feb. 26, 2019

(54) TANK VENTILATION SYSTEM

(75) Inventors: Rudolf Bierl, Regensburg (DE);
Stephan Heinrich, Pfeffenhausen (DE);
Andreas Wildgen, Nittendorf (DE)

(73) Assignee: Continental Automotive GmbH, Hannover (DE)

( * ) Notice: Subject to any disclaimer, the term of this patent is extended or adjusted under 35 U.S.C. 154(b) by 1666 days.

(21) Appl. No.: 13/133,019

(22) PCT Filed: Dec. 3, 2009

(86) PCT No.: PCT/EP2009/066293
§ 371 (c)(1),
(2), (4) Date: Aug. 22, 2011

(87) PCT Pub. No.: WO2010/063787
PCT Pub. Date: Jun. 10, 2010

(65) Prior Publication Data
US 2011/0300787 A1    Dec. 8, 2011

(30) Foreign Application Priority Data
Dec. 4, 2008  (DE) .................. 10 2008 060 248

(51) Int. Cl.
*B60H 1/26* (2006.01)
*B60K 15/035* (2006.01)

(52) U.S. Cl.
CPC .............................. B60K 15/03504 (2013.01)

(58) Field of Classification Search
CPC ............................................. B60K 15/03504
USPC ...................................................... 454/141
See application file for complete search history.

(56) References Cited

U.S. PATENT DOCUMENTS

| 4,613,290 | A | * | 9/1986 | Evenson .................. 417/517 |
| 5,479,905 | A | | 1/1996 | Ito |
| 5,575,307 | A | * | 11/1996 | Martinitz et al. ............. 137/205 |
| 5,816,222 | A | | 10/1998 | Kidokoro |
| 5,873,352 | A | | 2/1999 | Kidokoro et al. |
| 5,925,817 | A | | 7/1999 | Kidokoro et al. |
| 5,957,113 | A | * | 9/1999 | Masaki et al. ................ 123/518 |
| 6,176,118 | B1 | * | 1/2001 | Kidokoro et al. ................. 73/40 |
| 6,474,177 | B2 | * | 11/2002 | Maeda et al. ............. 73/861.63 |
| 6,589,410 | B1 | * | 7/2003 | Shoji et al. .................... 204/426 |
| 6,786,207 | B2 | * | 9/2004 | Kojima et al. ................ 123/516 |
| 7,146,970 | B2 | * | 12/2006 | Everingham et al. ........ 123/520 |
| 7,654,134 | B2 | * | 2/2010 | Enomoto et al. .......... 73/114.32 |
| 7,665,351 | B2 | * | 2/2010 | Kamiya ..................... 73/114.32 |
| 2005/0016505 | A1 | | 1/2005 | Everingham et al. |
| 2007/0157908 | A1 | | 7/2007 | Kano et al. |
| 2007/0227514 | A1 | | 10/2007 | Terada |
| 2009/0141769 | A1 | * | 6/2009 | Baldwin et al. ............. 374/144 |

FOREIGN PATENT DOCUMENTS

| GB | 2285972 | 8/1995 |
| JP | 8-094590 A | 4/1996 |

* cited by examiner

Primary Examiner — Steven B McAllister
Assistant Examiner — Steven Anderson, II
(74) Attorney, Agent, or Firm — Cozen O'Connor

(57) ABSTRACT

A tank ventilation system includes a flushing line, off which a bypass branches and into which the bypass opens out. A sensor is arranged in the flushing line bypass to determine a concentration of hydrocarbons in a fluid in the flushing line. A hydrocarbon tank is coupled via a first connector to a first end of the flushing line and designed for coupling, via a second coupling, to a tank.

6 Claims, 2 Drawing Sheets

TANK VENTILATION SYSTEM

PRIORITY CLAIM

This is a U.S. national stage of Application No. PCT/EP2009/066293, filed on Dec. 3, 2009, which claims priority to German Application No: 10 2008 060 248.5, filed: Dec. 4, 2008, the contents of which are incorporated herein by reference.

BACKGROUND OF THE INVENTION

1. Field of the Invention

The invention relates to a tank ventilation system. During the operation of an internal combustion engine, a large proportion of the pollutants emitted is attributable to exhaust gas formed as a result of combustion. There are other sources responsible for pollutant emissions. Among these sources is evaporative emissions from a fuel tank of the internal combustion engine.

2. Related Art

Fuels such as premium grade gasoline that can be stored in the fuel tank contain a number of volatile hydrocarbons. Among these are methane, butane and propane, for example. To protect the fuel tank from mechanical damage in the event of a change in the volume of the fuel and to allow pressure equalization between the fuel tank and the ambient air, the fuel tank can be coupled to the ambient air by a line. The highly volatile hydrocarbons may be released from the fuel especially at high outside temperatures, owing to irradiation by the sun, for example, or owing to shaking of the fuel tank during a journey, and can leave the fuel tank via the line as gaseous components.

SUMMARY OF THE INVENTION

It is an underlying object of one embodiment of the invention to provide a tank ventilation system that allows reliable ventilation of the tank and accurate emission of a specified quantity of pollutants from the tank ventilation system.

The invention is distinguished by a tank ventilation system, having a purge line, from which a bypass branches and into which the bypass opens. A sensor is arranged in the bypass of the purge line and is designed to determine the concentration of hydrocarbons in a fluid in the purge line. A hydrocarbon storage device is coupled at a first connection to a first end of the purge line and is designed for coupling, via a second connection, to a tank. The arrangement of the sensor in the bypass allows accurate and reliable determination of the concentration of hydrocarbons in the fluid in the purge line. This can lead to a reduction in pollutant emissions when the tank ventilation system is employed in an internal combustion engine when the fluid used to ventilate the tank is being metered via the intake system to the motor of the internal combustion engine and the dosing of a fuel can be specified accurately through accurate determination of the concentration of hydrocarbons in the fluid.

In a preferred embodiment, the bypass of the purge line is of U-shaped design. This makes possible laminar flow of the fluid in a zone around the sensor, leading to accurate and reliable measurement results from the sensor. By these embodiments of the bypass, it is furthermore possible to keep particles away from the sensor in an effective manner, thus effectively counteracting possible damage to the sensor and also any influences on the measurement results.

According to another advantageous embodiment, the purge line has a valve at a second end. This allows reliable ventilation of the tank.

BRIEF DESCRIPTION OF DRAWINGS

Illustrative embodiments of the invention are explained in greater detail below with reference to the schematic drawings, in which.

Elements of identical design or function are designated by the same reference signs throughout the figures.

DETAILED DESCRIPTION OF DRAWINGS

Figure 1:
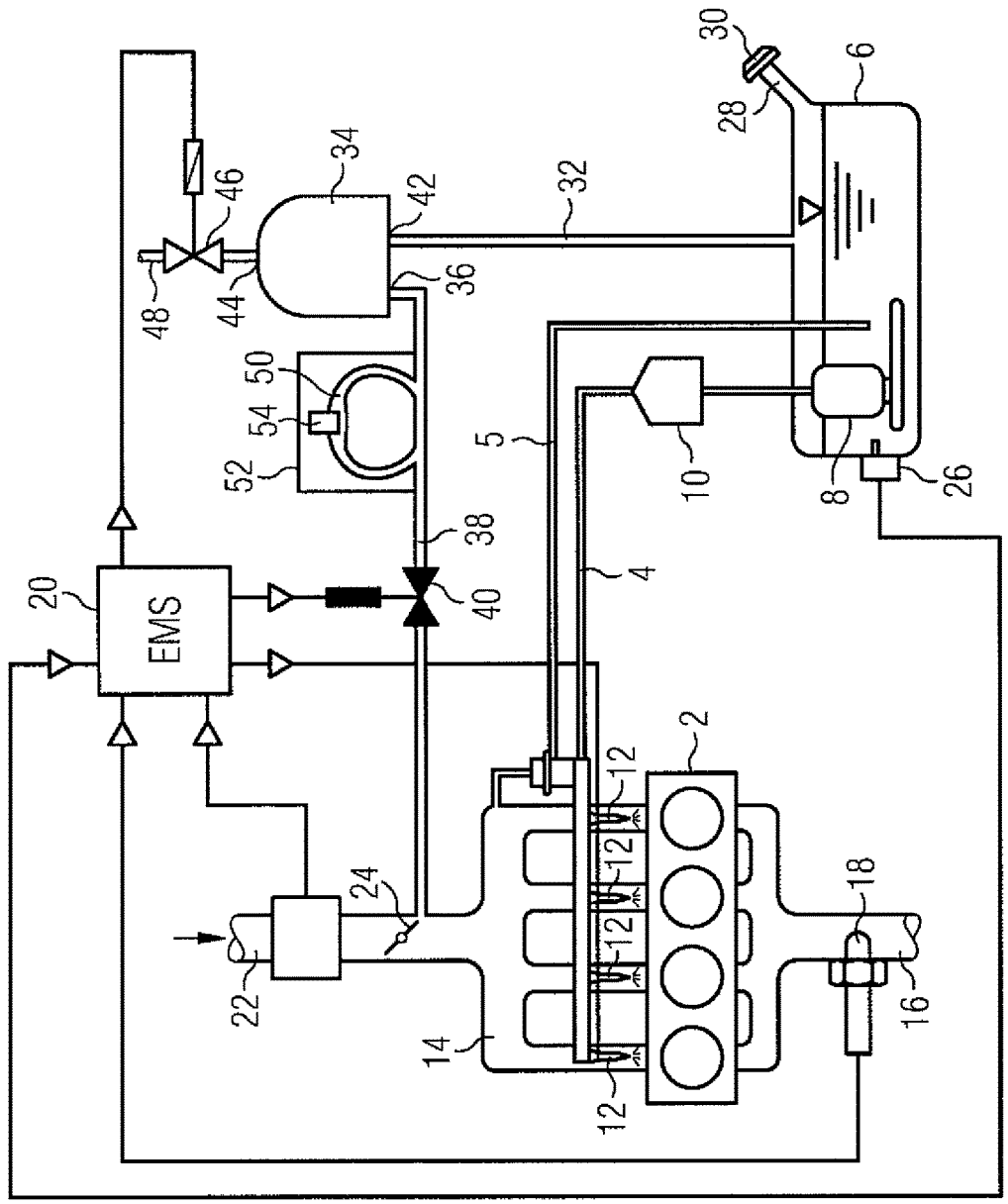
FIG. 1 is a schematic diagram of an internal combustion engine with a tank ventilation system.

FIG. 1 shows an internal combustion engine with an engine block 2, which is coupled hydraulically to a tank 6 by a fuel supply line 4 and a return line 5. The tank 6 can be a fuel tank, for example. Arranged in the tank 6 is a fuel delivery unit 8, which passes fuel via the fuel supply line 4 and a filter 10 arranged in the fuel supply line 4 to injection valves 12 arranged on the engine block 2. The injection valves 12 meter the fuel supplied into the engine block 2, where it is burnt together with air metered in a predetermined ratio relative to the fuel by an intake system 14. Exhaust gases formed in the combustion process are carried away from the engine block 2 by an exhaust system 16. Arranged in the exhaust system 16 is a lambda probe 18, which is designed to produce a measurement signal representative of an air/fuel ratio before combustion. The lambda probe 18 is electrically coupled to a control device 20 and is thus preferably part of a closed-loop lambda control system. The control device 20 can be designed as an engine control unit, for example. The air is fed to the intake system 14 via an air inlet 22, in which a throttle flap 24 is arranged.

A fuel sensor 26 is furthermore arranged in the tank 6. The fuel sensor 26 can be a "flex-fuel sensor" by which the composition of the fuel can be determined. Highly volatile hydrocarbons may evaporate from the fuel, especially at high ambient temperatures. This gives rise to an air/fuel mixture enriched with hydrocarbons in the tank 6, said mixture being referred to below as fluid F.

The tank 6 has a filler neck 28, at the end of which it is closed off hermetically from the outside by means of a tank cap 30. While the internal combustion engine is in operation, there may be a reduction in the volume of the fuel stored in the tank 6, owing to removal of fuel by the fuel delivery unit 8 for example. An enlargement of the volume of fuel in the tank 6 is also possible, for example, owing to temperature-induced expansion of the fuel with high outside temperatures and prolonged periods when the internal combustion engine is stationary, for example. In order to counteract damage to the tank 6 in an effective manner, the tank 6 is coupled to a ventilation line 32 to allow pressure equalization between the tank 6 and the ambient air if there is a change in the volume of the tank contents. If there are changes in the volume of the tank contents, the fluid F enriched with hydrocarbons can enter the ventilation line 32. It is also possible, for example, for fuel to enter the ventilation line 32, owing to shocks imposed on a vehicle in which the internal combustion engine with the tank 6 is arranged, for example. In this case, the proportion of hydrocarbons in the fluid F is particularly high.

For filtering the hydrocarbons contained in the fluid F, the internal combustion engine has a hydrocarbon storage device 34. The hydrocarbon storage device 34 can be designed as an activated carbon filter, for example, and is designed to absorb and store hydrocarbons. The hydrocarbon storage device 34 has three connections. A first connection 36 is coupled to a purge line 38, which is coupled to a valve 40 and, via the valve 40, to the intake system 14. The valve 40 is electrically coupled to the control device 20, by which it can be controlled. Via a second connection 42 and the ventilation line 32, the hydrocarbon storage device 34 is coupled to the tank 6. A third connection 44 couples the hydrocarbon storage device 34 to a purge air inlet 48 via a purge valve 46. The purge valve 46 is electrically coupled to the control device 20 and can be controlled by the control device 20.

The purge line 38 arranged between the first connection 36 of the hydrocarbon storage device 34 and the valve 40 has a bypass 50, which is arranged in a sensor housing 52. The bypass 50 branches off from the purge line 38 and opens into the purge line 38 again. Arranged in the bypass 50 is a sensor 54, which is designed to determine the concentration of hydrocarbons cHC in the purge line 38.

The absorption capacity of the hydrocarbon storage device 34 for hydrocarbons is limited. If the hydrocarbon storage device 34 reaches saturation, it is purged. For this purpose, the purge valve 46 and valve 40 are opened, with the result that ambient air enters the hydrocarbon storage device 34 via the purge air inlet 48 and the purge valve 46, absorbing the hydrocarbons stored in the hydrocarbon storage device 34 and metering them into the intake system 14 of the internal combustion engine via the purge line 38 and valve 40. For this purpose, the purge valve 46 and valve 40 can be controlled by the control device 20.

To reduce pollutants from the internal combustion engine and also to optimize performance, the air/fuel ratio of the air/fuel mixture is specified. The fluid F enriched with hydrocarbons from the hydrocarbon storage device 34 passes via valve 40 into the intake system 14, where it can influence the composition of the air/fuel mixture with respect to the hydrocarbon content thereof. To enable the air/fuel ratio to be specified accurately, a hydrocarbon concentration cHC of the fluid F enriched with hydrocarbons is detected by the sensor 54. For a known hydrocarbon concentration cHC of the fluid F, the supply of air from the air inlet 22 and of fuel can then be adapted accordingly. The mass flow of the fluid F enriched with hydrocarbons can also be controlled by valve 40, for example, e.g. by the control device 20.

Figure 2:
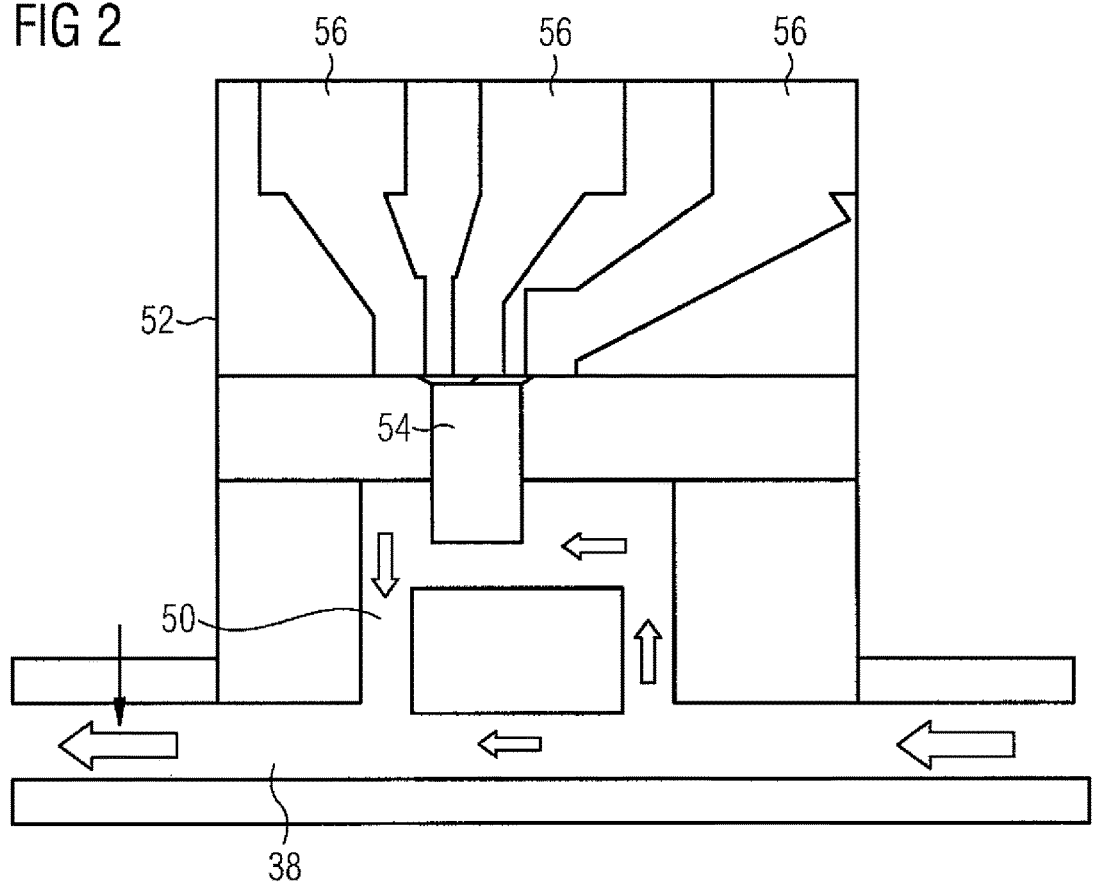
FIG. 2 is a cross section of a sensor housing.

FIG. 2 shows the sensor housing 52, which is coupled to the purge line 38 and in which the bypass 50 branches off from the purge line 38 and opens into the latter again. The sensor 54 is arranged partially in the bypass. The sensor 54 is electrically coupled to an electronic evaluation unit by way of electrical contacts 56. A flow pattern of the fluid F in the purge line 38 and in the bypass 50 is indicated schematically by arrows.

In a preferred embodiment, the electronic evaluation unit is decoupled hydraulically and pneumatically from the bypass 50. In another preferred embodiment, the bypass 50 is of U-shaped design. This makes possible laminar flow of the fluid F in a zone around the sensor 54. Water and dirt particles are kept away from the sensor 54 through the design of the bypass 50, making it possible to counteract damage to and falsification of measurement results from the sensor 54 in an effective manner.

Figure 3:
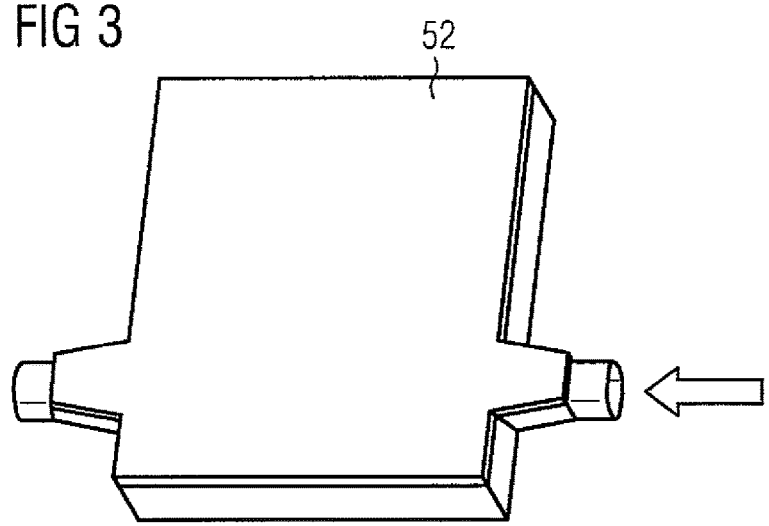
FIG. 3 is the sensor housing.

FIG. 3 shows the sensor housing 52 in which the bypass 50 and the sensor 54 are arranged.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A tank ventilation system, comprising:
   a purge line, off which a first end of a bypass line branches at a branch off and into which a second end of the bypass line opens downstream of the branch off, wherein the bypass line has only one input, the only one input arranged at the first end of the bypass line and only one output arranged at the second end of the bypass line opposite the first end of the bypass line;
   a sensor, arranged in the bypass line and configured to determine a concentration of hydrocarbons in a fluid in the purge line; and
   a hydrocarbon storage device having a first and a second connection, the first connection coupled to a first end of the purge line, the second connection configured for connection to a tank.

2. The tank ventilation system as claimed in claim 1, in which the bypass line is U-shaped.

3. The tank ventilation system as claimed claim 2, wherein the purge line comprises a valve arranged at the second end of the purge line opposite the first end of the purge line.

4. The tank ventilation system as claimed claim 1, wherein the purge line comprises a valve arranged at the second end of the purge line opposite the first end of the purge line.

5. The tank ventilation system as claimed claim 4, wherein the sensor is arranged in a housing.

6. The tank ventilation system as claimed claim 5, wherein the sensor is connected to at least one electrical contact arranged in the housing.

* * * * *